United States Patent
Sato et al.

[19]

[11] Patent Number: 5,482,382
[45] Date of Patent: Jan. 9, 1996

[54] BALL BEARING

[75] Inventors: Takanobu Sato, Odawara; Hirotoshi Takata; Ryo Goino, both of Yokohama, all of Japan

[73] Assignee: NSK Ltd., Tokyo, Japan

[21] Appl. No.: 400,747

[22] Filed: Mar. 8, 1995

[30] Foreign Application Priority Data

Apr. 8, 1994 [JP] Japan .................................. 6-070477

[51] Int. Cl.⁶ ........................... F16C 33/02; F16C 19/10
[52] U.S. Cl. ........................ 384/492; 384/609; 384/625
[58] Field of Search ................................. 384/492, 569, 384/609, 615, 625

[56] References Cited

U.S. PATENT DOCUMENTS

| | | | |
|---|---|---|---|
| 3,734,582 | 5/1973 | Beauchet | 384/492 |
| 4,523,863 | 6/1985 | Okoshi | 384/609 |
| 4,659,241 | 4/1987 | Bamberger et al. | 384/625 |
| 4,880,281 | 11/1989 | Merkelbach | 384/492 X |
| 5,147,140 | 9/1992 | Murakami et al. | 384/492 |

FOREIGN PATENT DOCUMENTS 62-71465   5/1987   Japan .
62-199557  12/1987  Japan .

*Primary Examiner*—Thomas R. Hannon
*Attorney, Agent, or Firm*—Sughrue, Mion, Zinn, Macpeak & Seas

[57] ABSTRACT

A thrust ball bearing in which the lives of a power roller and an outer ring can be ensured without increasing a rotational resistance. The thrust ball bearing can thus be improved in durability without impairing the performance of a toroidal type continuously variable transmission having such a thrust ball bearing built thereinto. Fracture toughness $K_{1c}$ of a material forming the power roller is made higher than fracture toughness $K_{1c}'$ of a material forming the outer ring ($K_{1c} > K_{1c}'$). Further, the maximum contact surface pressure $P_{max}$ between an inner ring raceway and the respective balls is made smaller than the maximum contact surface pressure $P_{max}'$ between an outer ring raceway and the respective balls ($P_{max} < P_{max}'$).

12 Claims, 4 Drawing Sheets

BALL BEARING

BACKGROUND OF THE INVENTION

1. Field of the Invention

The present invention relates to a ball bearing. More particularly, the present invention relates to a thrust ball bearing for undergoing a thrust load applied to power rollers which forms a toroidal type continuously variable transmission, or relates to a radial ball bearing for supporting various types of rotating shafts.

2. Description of the Related Art

Research is in progress to employ a continuously variable toroidal transmission which is schematically shown in FIGS. 1 and 2 for use as, for example, a transmission for automobiles, or various types of industrial machines. As disclosed in, for example, Japanese Utility Model Laid-Open No. 62-71465, a toroidal type continuously variable transmission is constructed in such a way that an input-side disk 2 is concentrically supported by an input shaft 1 and an output-side disk 4 is secured at an end of an output shaft 3. The inner surface of a casing containing the toroidal type continuously variable transmission or a supporting bracket mounted in the casing is provided with trunnions 6, 6 to be swung around axes 5, 5 located in diagonal positions with respect to the input shaft 1 and the output shaft 3.

The respective trunnions 6, 6 are provided on outer surface of both end portions with the axes 5, 5. The central portions of the trunnions 6, 6 support the base portions of respective displacement axes 7, 7. The inclinations of the displacement axes 7, 7 can be freely adjusted by swinging the respective trunnions 6, 6 around the axes 5, 5. Power rollers 8, 8 are rotatably supported around the displacement axes 7, 7 which are supported by the respective trunnions 6, 6. The power rollers 8, 8 are tightly held between the input-side disk 2 and the output-side disk 4.

Inner side surfaces 2a and 4a of the input-side and output-side disks 2 and 4 being in opposition to each other have circular arch-like shapes in section with the axes 5, 5 as the centers. Spherically formed peripheral surfaces 8a, 8a of the power rollers 8, 8 are in contact with the inner side surfaces 2a and 4a.

A loading cam-type pressing device 9 is provided between the input shaft 1 and the input-side disk 2. The input-side disk 2 is pressed elastically toward the output-side disk 4 by the pressing device 9. The pressing device 9 comprises a cam plate 10 which is rotated together with the input shaft 1 and a plurality of rollers 12, 12 (for example, four rollers) held by a retainer 1. One side surface of the cam plate 10 (left-side surface in FIGS. 1 and 2) forms a cam surface 13 having irregularities in the circumferential direction. Also, an outer side surface of the input-side disk 2 (the right-side surface in FIGS. 1 and 2) forms a cam surface 14. The plurality of rollers 12, 12 are respectively supported rotatably around axes in the radial directions with respect to the center of the input shaft In the above-structured toroidal type continuously variable transmission, when the cam plate 10 is rotated in accordance with rotation of the input shaft 1, the plurality of rollers 12, 12 are pressed by the cam surface 13 against the cam surface 14 of the input-side disk 2. As a result, as soon as the input-side disk 2 is pressed against the power rollers 8, 8 the input-side disk 2 is rotated due to-the engagement of the cam surfaces 13, 14 and the plurality of rollers 12, 12. Then, the rotation of the input-side disk 2 is transmitted via the power rollers 8, 8 to the output-side disk 4, whereby the output shaft 3 fixed to the output-side disk 4 is rotated.

When changing the rotation speed between the input shaft 1 and the output shaft 3 and first when performing deceleration between the input shaft 1 and the output shaft 3, the trunnions 6, 6 are swung around the axes 5, 5 to incline the displacement axes 7, 7 such that the peripheral surfaces 8a, 8a of the power rollers 8, 8 are brought into contact with portions of the inner side surface 2a of the input-side disk 2 close to the center thereof and portions of the inner side surface 4a of the output-side disk 4 close to the outer periphery thereof, as shown in FIG. 1.

On the other hand, when performing acceleration, the trunnions 6, 6 are swung to incline the displacement axes 7, 7 such that the peripheral surfaces 8a, 8a of the power rollers 8, 8 are brought into contact with portions of the inner side surface 2a of the input-side disk 2 close to outer periphery thereof and portions of the inner side surface 4a of the output-side disk 4 close to the center thereof, as shown in FIG. 2. When the inclinations of the displacement axes 7, 7 are set so as to be the intermediate position of FIGS. 1 and 2, it is possible to obtain the intermediate variable speed ratio between the input shaft 1 and the output shaft 3.

FIGS. 1 and 2 merely show the basic construction of the toroidal type continuously variable transmission. However, various types of more specific constructions used as automobile transmissions are conventionally known, as disclosed in, for example, a microfilm of Japanese Utility Model Application No. 61-87523 (Japanese Utility Model Laid-Open No. 62-199557).

For the operation of the toroidal type continuously variable transmission constructed as described above, the power rollers 8, 8 are rotated at a high speed while being subjected to a thrust load from the input-side disk 2 and the output-side disk 4. In order to bear such a thrust load, thrust ball bearings 15 illustrated in FIG. 3 are arranged between the power rollers 8, 8 and the trunnions 6, 6, respectively.

A thrust ball bearing 15 (in FIG. 3) comprises: a power roller 8, which also serves a function of an inner ring, that is, a first raceway ring; a plurality of balls 16, 16; a cage 20 for retaining the balls 16, 16, which can be freely rolled; and an outer ring 17, that is, a second raceway ring, which shares a central axis α with the power roller 8. The power roller 8, the balls 16, 16 and the outer ring 17 are formed of steel used for bearings, such as bearing steel, carburized steel or the like. An inner ring raceway 18, which is a first raceway, is formed at one surface (top surface of FIG. 3) along the axis of the power roller 8, while an outer ring raceway 19, which is a second raceway, is formed on one surface (bottom surface of FIG. 3) along the axis of the outer ring 17 so as to opposedly face the inner ring raceway 18. These raceways 18 and 19 are sectionally circular, but annular as a whole. The conventional thrust ball bearing 15 as described above is constructed such that the radius of curvature R18 in a cross section of the inner ring raceway 18 is equal to the radius of curvature $R_{19}$ in a cross section of the outer ring raceway 19 (i.e., The balls 16, 16 abut against the inner ring raceway 18 and the outer ring raceway 19 while being rolled.

However, there presents the following problems in the thrust ball bearing 15 built into a toroidal type continuously variable transmission for practical use so as to bear the power rollers 8. The power rollers 8 which double as an inner ring are subjected to loads from two points, that is, from a point of contact between the power rollers 8 and the input-side disk 2 and another point of contact between the power rollers 8 and the output-side disk 4, these disks 2 and 4 being opposedly arranged at the opposite ends of the diameter of the power rollers 8. However, the loads are not applied to the power rollers is when the power rollers 8 are circumferentially displaced from the above-mentioned points of contact at 90°, thereby failing to ensure the uniform load distribution along the overall circumference of the power rollers 8. In consequence, the power rollers 8 are subjected to a stress field to which bending stress is applied. In contrast, the outer ring 17 undergoes a substantially uniform load along the overall circumference by means of the balls 16, 16 which are equally spaced along the circumference.

It is further necessary to restrict the installment positions of the power rollers 8 so as to ensure a gear ratio of the toroidal type continuously variable transmission. The power rollers 8 are thus required to have a sufficient thickness $T_8$. The power rollers 8 having the function of the inner ring of the thrust ball bearing 15 are further subjected to a stress field in which stress intensity factor increases. This jeopardizes the life of the power rollers 8, which is determined depending on not only a mode 2 (corresponding to rolling contact fatigue) but also a mode 1 (corresponding to bending fatigue). Among modes 1 and 2, the mode 2 which can be expressed in the form of the plane shearing is concerned with the rolling fatigue caused by flaking, which fatigue shortens the fatigue life of a typical thrust ball bearing. This adversely influences not only the thrust ball bearings for toroidal type continuously variable transmissions but also general ball bearings. On the other hand, the mode 1 in the opened form is concerned with the bending fatigue which leads to cracking in the inner ring. Such cracking gives rise to fatigue peculiar to a thrust ball bearing used for the toroidal type continuously variable transmission in which a nonuniform load is applied to the power rollers 8 having a large thickness.

Hence, in order to ensure the durability of the thrust ball bearing for the toroidal type continuously variable transmission, consideration must be taken for the mode 1 indicative of the bending fatigue, as well as the mode 2 representing the rolling contact fatigue, which is typically considered for guaranteeing durability. With a view to preventing cracking due to the bending fatigue represented by the mode 1 and to prolonging the life of the raceway ring, the raceway ring should be formed of a material having a high degree of the fracture toughness $K_{1c}$. However, a material having a high degree of the fracture toughness $K_{1c}$ is not necessarily effective for avoiding the rolling contact fatigue represented by the mode 2 and may sometimes fail to prolong the rolling contact fatigue life represented by the mode 2. For example, for prolonging the rolling contact fatigue life by using a carburized SCr, it is necessary to some extent to have a higher content of carbon (C%) of such a material (steel) and to carburize it to a certain degree of depth. However, an increase in the higher content of C% and in the carburizing depth of the material decreases the fracture toughness $K_{1c}$. As is seen from the above contradiction, among the two types of materials A and B which are formed of the same material but different compositions and have been allowed to undergo a thermal treatment, there are some cases in which the material A is more resistant to the bending fatigue represented by the mode 1 than the material B, while the material B is more resistant to the rolling contact fatigue represented by the mode 2 than the material A. This contraction requires a careful selection of a material.

For increasing the fracture toughness $K_{1c}$, the following factors (1)–(4) may be considered by way of example.

(1) Decreasing the grain size of the crystal structure of a material, (2) Distributing a microfine carbide in the crystal grains, (3) Raising the tempering temperature so as to decrease the hardness level of a material, and (4) When steel undergoes surface treatments, such as carburizing, nitriding, induction hardening, and the like, the depth of the surface to be hardened is decreased and a level of hardness of the core is decreased.

From the above factor (4), the surface hardened steel results in a higher degree of a fracture toughness than fully quenched steel. Conversely, the following factors incur a reduction in the fracture toughness of the members formed of the same material: (a) an increase in the dimensions of members, (b) a reduction in the atmospheric temperature, and (c) an increase in the loading speed.

When a material having a low degree of the fracture toughness $K_{1c}$ cannot be used for the power rollers 8 because of the restriction of the configuration, which the power rollers 8 constitute the thrust ball bearing 15 for the toroidal type continuously variable transmission, that is, when it is necessary to ensure the resistance to the bending fatigue represented by the mode 1, there is no choice but to use a material having a low resistance to the rolling contact fatigue represented by the mode 2 and having a high degree of the fracture toughness $K_{1c}$. Thus, without making any adjustments to the material, flaking is likely to occur on the inner ring raceway 18 mounted on the power roller 8 formed of the material provided with the above-mentioned characteristics. In order to use a material having a higher degree of the fracture toughness $K_{1c}$ and yet be substantially free from flaking, it is necessary that the radius of the curvature $R_{18}$ in a cross section of the inner ring raceway 18 be decreased (approximates one half of the external diameter of the balls 16, 16) and that the area of contact between the rolling surfaces of the balls 16, 16 and the inner ring raceway 18 be increased, thereby inhibiting a maximum contact surface pressure of such a point of contact. However, a decrease in the radius of a curvature in a cross section of the raceway surface causes an increase in the rolling resistance between the raceway surface and the rolling surfaces of the balls 16, 16.

The conventional thrust ball bearing 15 described above is constructed in such a way that the radius of the curvature $R_{18}$ in a cross section of the inner ring raceway 18 is equal to the radius of the curvature $R_{19}$ in a cross section of the outer ring raceway 19 (i.e., Therefore, a mere decrease in the radius of the curvatures R18 and R19 in a cross section of the respective raceways 18 and 19 results in an increase in the rolling resistance applied to the thrust ball bearing 15, thereby increasing power loss of the toroidal type continuously variable transmission having such a built-in thrust ball bearing 15. Such a problem is applied not only to the thrust ball bearing 15 but to radial ball bearings depending on the conditions Of use.

SUMMARY OF THE INVENTION

Accodingly, a ball bearing of the present invention has been completed in view of such a background.

According to the present invention, there is provided a ball bearing, as well as a conventionally-known ball bearing, comprising: a first raceway ring; a first raceway having sectionally circular, but annular as a whole, the first raceway being formed on one surface of the first raceway ring; a second raceway ring arranged to be concentric with the first raceway ring; a second raceway having sectionally circular, but annular as a whole, the second raceway being formed on one surface of the second raceway ring and being positioned to oppposedly face the first raceway; and a plurality of balls of which rolling surfaces are allowed to abut against the first and second raceways. The ball bearing is exposed to a stress field in which the stress intensity factor of the first raceway ring becomes greater than that of the second raceway ring when it is provided for use.

In particular, the ball bearing of the present invention is constructed in such a way that the fracture toughness of a material forming the first raceway ring is made greater than that of a material forming the second raceway ring. Along with such characteristics, the maximum contact surface pressure between the first raceway and the respective balls is made smaller than that between the second raceway and the respective balls.

According to the ball bearing constructed as described above, the first raceway ring is formed of a material having a higher degree of the fracture toughness, thereby inhibiting the occurrence of cracks due to the bending fatigue represented by the mode 1 in the first raceway ring. Also, based on the small maximum contact surface pressure between the balls and the first raceway formed on the first raceway ring, flaking due to the rolling contact fatigue represented by the mode 2 is unlikely to occur in the first raceway.

The bending fatigue represented by the mode 1 does not particularly have to be taken into account to form the second raceway ring, which is thus not required to be formed of a material having a higher degree of the fracture toughness but can be formed of a material only resistant to the rolling contact fatigue represented by the mode 2. Accordingly, it is not necessary to lower the maximum contact surface pressure between the balls and the second raceway formed on the second raceway ring, thereby avoiding an increase in the rolling resistance between the second raceway and the balls. As a consequence, an increase in the rolling resistance of the overall ball bearing can also be suppressed.

For adjustments of the fracture toughness into a correct value with a view to ensuring the strength resistant to the bending fatigue and the rolling contact fatigue, surface hardening treatments, for example, carburizing, carbo-nitriding, induction hardening or the like, are performed as the surface hardening on bearing steel forming the respective raceway rings.

DESCRIPTION OF THE PREFERRED EMBODIMENTS

Figure 1:
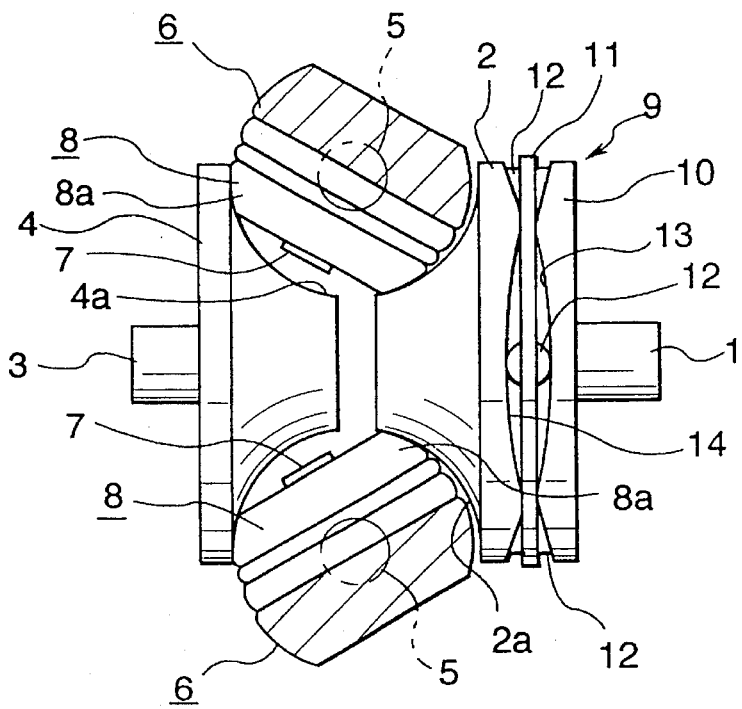
FIG. 1 is a side view illustrative of the basic construction of a toroidal type continuously variable transmission having a built-in thrust ball bearing therein when the maximum speed reduction is achieved.
Figure 2:
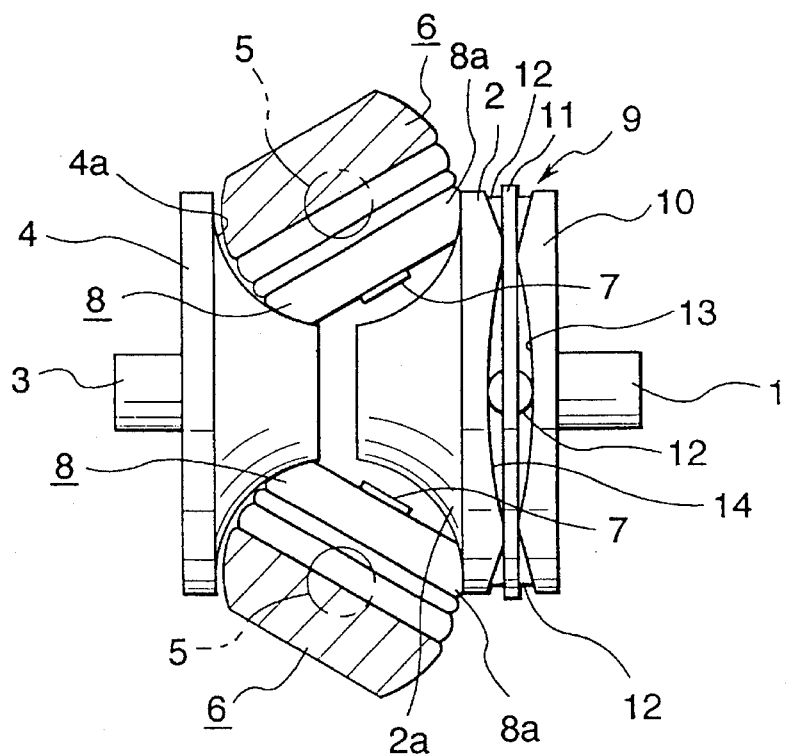
FIG. 2 is a side view illustrative of the toroidal type continuously variable transmission shown in FIG. 1 when the maximum speed increase is achieved.
Figure 3:
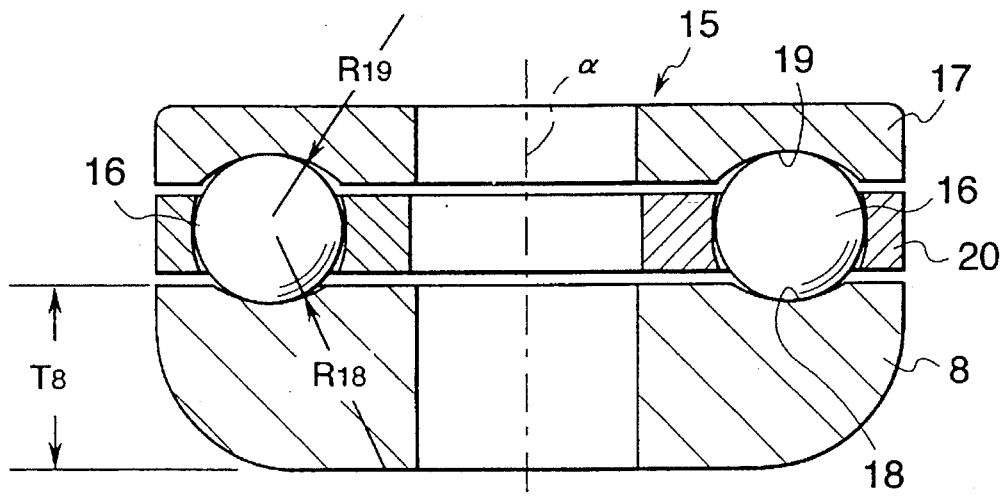
FIG. 3 is a cross sectional view of a thrust ball bearing incorporated into a toroidal type continuously variable transmission.
Figure 4:
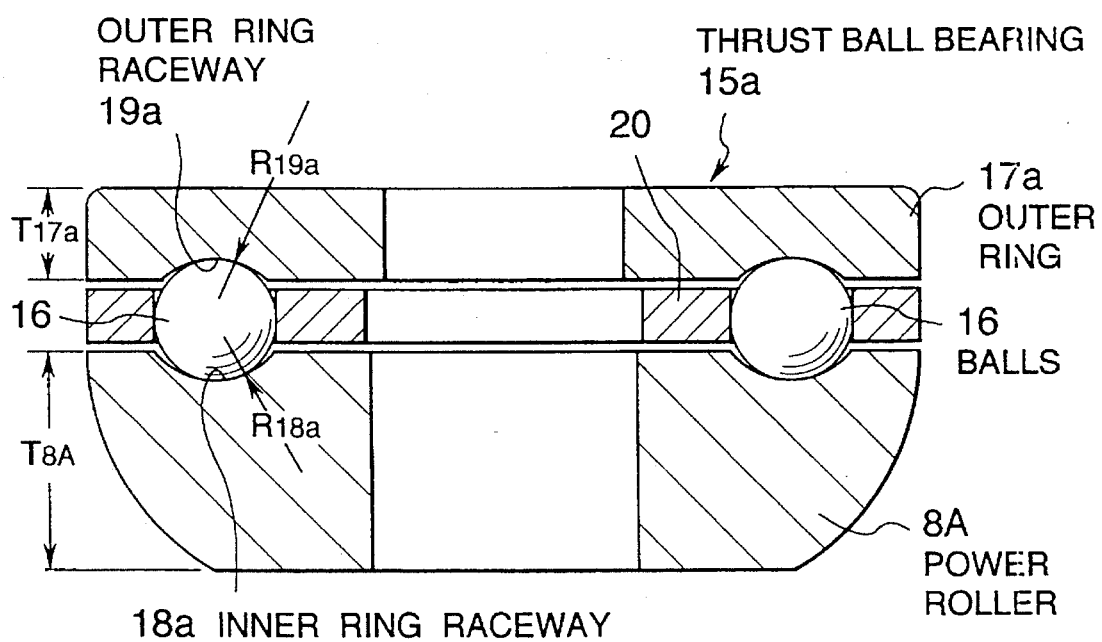
FIG. 4 is a cross sectional view illustrative of a first embodiment of the present invention.

FIG. 4 illustrates the present invention applied to a thrust ball bearing 15a for use in a toroidal type continuously variable transmission according to a first embodiment of the present invention. The thrust ball bearing 15a, as well as the conventionally-known thrust ball bearing 15 shown in FIG. 3, includes a power roller 8A which doubles as a function of an inner ring, that is, a first raceway ring. An inner ring raceway 18a having sectionally circular, but annular as a whole, which is a first raceway, is axially formed on one surface (the top surface of FIG. 4) of the power roller 8A. An outer ring 17a, which is a second raceway ring, is arranged to be concentric with the power roller 8A. An outer ring raceway 19a having sectionally circular, but annular as a whole, which is a second raceway, is axially formed on one surface (the bottom surface of FIG. 1) of the outer ring 17a so as to opposedly face the inner ring raceway 18a. A plurality of balls 16, 16 are arranged between the outer ring raceway 19a and the inner ring raceway 18a so as to allow the balls 16, 16 to abut against the outer ring raceway 19a and the inner ring raceway 18a while being rolled. The balls 16, 16 are retained by a cage 20 in such a way that they can be allowed to freely roll.

In the thrust ball bearing 15a used in the toroidal type continuously variable transmission constructed as described above, a thickness $T_{8a}$ of the power roller 8A serving the function of an inner ring is greater than a thickness T17a of the outer ring 17a, thereby accordingly resulting in a higher degree of a stress intensity factor $K_1$ of the power roller 8A than a stress intensity factor $K_1'$ ($K_1 > K_1'$) of the outer ring 17a during the use of the continuously variable transmission.

The thrust ball bearing 15a of the above embodiment is constructed such that along with such a disparity of the stress intensity factors $K_1'$, a fracture toughness $K_{1c}$ of a material forming the power roller 8A is greater than a fracture toughness $K_{1c}'$ of a material forming the outer ring 17a (i.e., $K_{1c} > K_{1c}'$). In connection with the above-mentioned characteristics, the maximum contact surface pressure $P_{max}$ between the inner ring raceway 18a and the respective balls 16, 16 is made smaller than the maximum contact surface pressure $P_{max}'$ between the outer ring raceway 19a and the respective balls 16, 16 (i.e., $P_{max} < P_{max}'$). For the achievement of such characteristics, this embodiment is constructed in such a way that the radius of a curvature $R_{18a}$ in a cross section of the inner ring raceway 18a is made smaller than the radius of a curvature $R_{19a}$ in a cross section of the outer ring raceway 19a (i.e., $R_{18a} < R_{19a}$).

The following methods may be employed by way of example to make the fracture toughness $K_{1c}$ of the power roller 8A greater than the fracture toughness $K_{1c}'$ of the outer ring 17a according to the factors for increasing a fracture toughness as described in the conventional art of ball bearings.

(1) The power roller 8A is formed of surface hardened steel, while the outer ring 17a is formed of fully hardened steel.

(2) The depth of the power roller 8A to be carburized is formed shallower than that of the outer ring 17a. Or alternatively, a level of hardness of the core of the power roller 8A is formed smaller than that of the outer ring 17a.

(3) A level of hardness of the power roller 8A is formed lower than that of the outer ring 17a.

In the ball bearing constructed as described above, a uniform load cannot be applied to the entire circumference of the points of contact between the power roller 8A and an input-side disk and an output-side disk. Also, since the power roller 28A has a greater thickness $T_{8A}$, it is likely to be exposed in a stress field to which a higher degree of the stress intensity factor $K_1$ is applied. Such the power roller 8A is formed of a material having a higher degree of the fracture toughness. Accordingly, even though the power roller 8A has a higher degree of the stress intensity factor $K_1$, cracks due to the bending fatigue represented by the mode 1 are unlikely to occur in the power roller 8A. Further, flaking due to the rolling contact fatigue represented by the mode 2 is unlikely to occur on the inner ring raceway 18a based on the small maximum contact surface pressure $P_{max}$ between the balls 16, 16 and the inner ring raceway 18a arranged around the power roller 8A.

In contrast, the outer ring 17a is not directly in contact with the respective disks, and a substantially uniform load is applied to the overall circumference of the outer ring 17a by means of equally-spaced balls. Also, since the thickness $T_{17a}$ of the outer ring 17a is not as large as the thickness $T_{8A}$ of the power roller 8A (inner ring), the outer ring 17a is exposed to a stress field having a smaller degree of the stress intensity factor $K_1'$ than the power roller 8A. Thus, regarding the outer ring 17a, it is not particularly necessary to pay attention to the bending fatigue represented by the mode 1. That is, the outer ring 17a is not required to be formed of a material having a high degree of the fracture toughness $K_{1c}'$, and instead must be formed of a material which has resistant to the rolling contact fatigue represented by the mode 2, although such a material may have a lower degree of the fracture toughness $K_{1c}'$. Hence, it is not necessary to decrease the maximum contact surface pressure $P_{max}'$ between the outer ring raceway 19a and the respective balls 16, 16. More specifically, the radius of the curvature $R_{19a}$ in a cross section of the outer ring raceway 19a is made greater than the radius of the curvature $R_{18a}$ in a cross section of the inner ring raceway 18a, thus decreasing the area of contact between the rolling surfaces of the respective balls 16, 16 and the outer ring raceway 19a, thereby inhibiting an increase in the rolling resistance between the outer ring raceway 19a and the balls 16, 16. In consequence, the increasing of the rolling resistance of the overall ball bearing can also be restrained.

Figure 5:
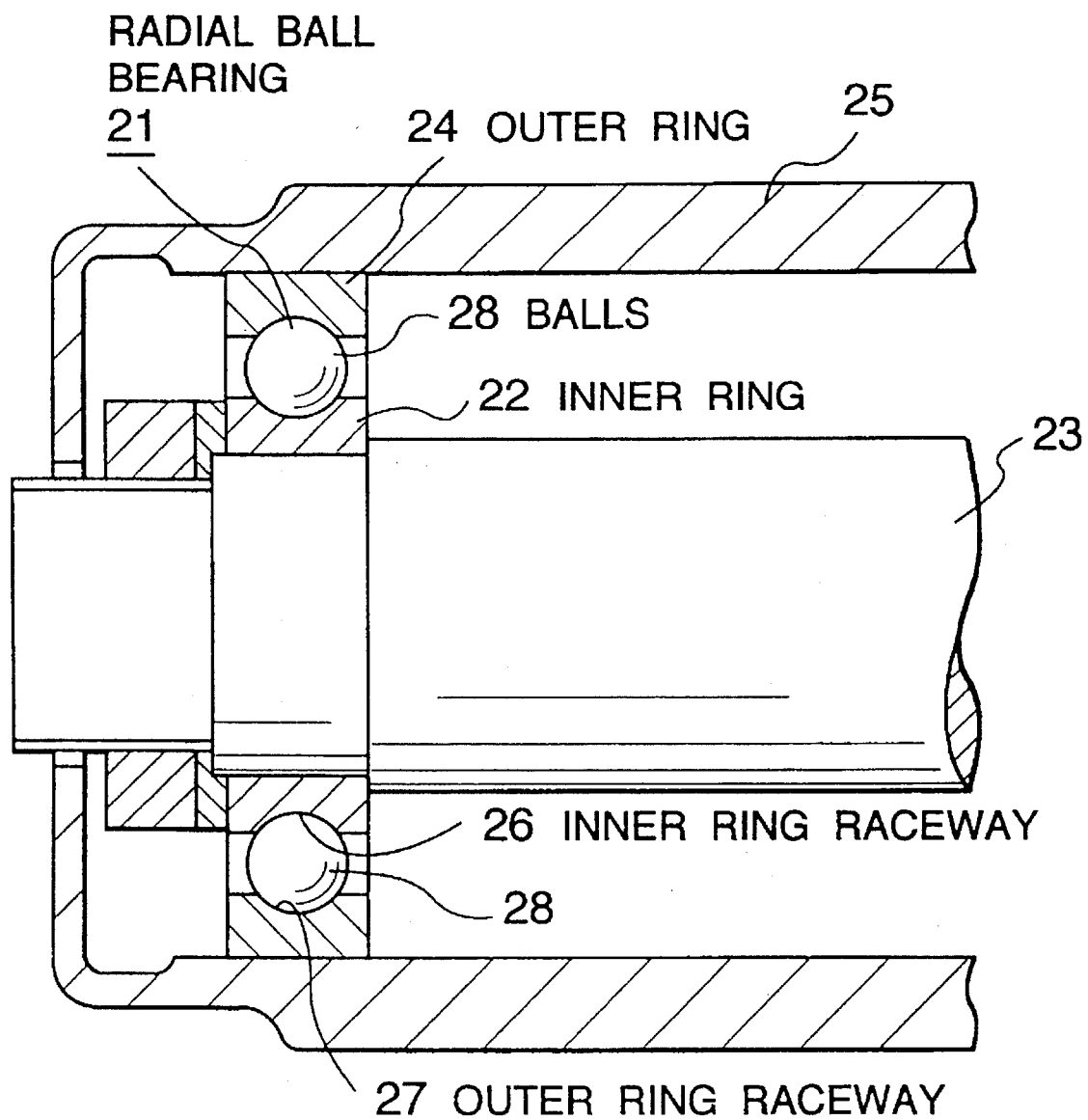
FIG. 5 is a cross sectional view illustrative of a second embodiment of the present invention.

FIG. 5 illustrates a second embodiment of the present invention. In this embodiment, the present invention is applied to a deep-groove type radial ball bearing 21. For the use of the radial ball bearing 21, an inner ring 22 is fit around a shaft 23, and an outer ring 24 is fit inside a housing 25. In the radial ball bearing 21 constructed as described above, cracks due to the bending fatigue represented by the mode 1 may occur in the outer ring 24 depending on the condition of the use, based on a nonuniform radial load applied from the housing 25.

When the radial ball bearing 21 is provided for the above-mentioned use which gives rise to the occurrence of cracks, the outer ring 24 is formed of a material having a higher degree of the fracture toughness $K_{1c}'$, thereby avoiding the cracks in the outer ring 24. In the radial ball bearing 21, unless the radius of a curvature in a cross section of an inner ring raceway 26 is formed much smaller than that of an outer ring raceway 27, the maximum contact surface pressure $P_{max}$ between the respective balls 28, 28 and the inner ring raceway 26 which has a comparatively small radius of the curvature along the circumference and which circumferentially bends in the form of a convex is made greater than the maximum contact surface pressure $P_{max}$ between the respective balls 28, 28 and the outer ring raceway 27 which has a comparatively large radius of the curvature along the circumference and which circumferentially bends in form of a concave (i.e., $P_{max} > P_{max}$). In order to achieve this effect, the inner ring 22 provided with the inner ring raceway 26 in which the maximum contact surface pressure Pmax becomes large should be formed of a material which is highly resistant to the rolling contact fatigue represented by the mode 2, although such the material may have a lower degree of the fracture toughness $K_{1c}$.

Figure 6:
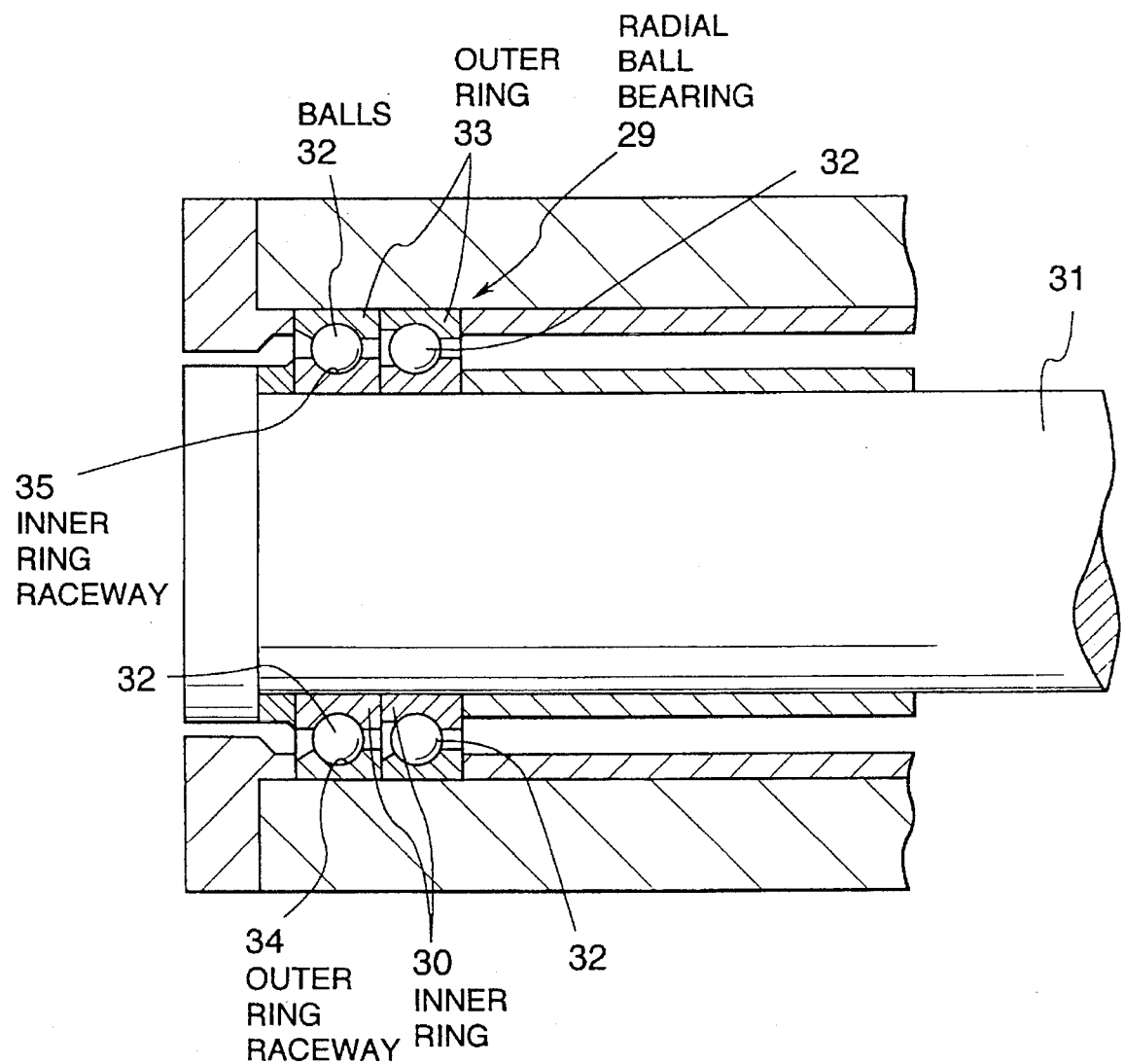
FIG. 6 is a cross sectional view illustrative of a third embodiment of the present invention.

A description will now be given of a third embodiment of the present invention shown in FIG. 6. In this embodiment, the present invention is applied to an angular contact ball bearing 29 which is used to cope with a high speed rotation (large $d_m n$ value) of an inner ring. In the angular contact ball bearing 29 of this type, a load is applied to an inner ring 30 from the contact portion between the inner ring 30 and a rotating shaft 31 due to a centrifugal force and heat emission, which may result in cracks in the inner ring 30. In otherswords, the inner ring 80 is exposed to a stress field so that the stress intensity factor K, of the inner ring 30 becomes higher than the stress intensity factor K, of an outer ring 33 (i.e., $K_1 > K_1'$). On the other hand, balls 32, 32 are abuted against an outer ring raceway 34 arranged on an inner peripheral surface of the outer ring 33 due to a centrifugal force along with high speed rotation. Consequestly, the maximum contact surface pressure $P_{max}$ between the rolling surfaces of the balls 32, 32 and the outer ring raceway 34 becomes greater than the maximum contact surface pressure $P_{max}$ between the rolling surfaces of the balls 32, 32 and an inner ring raceway 35 arranged on an outer peripheral surface of the inner ring 30 (i.e., $P_{max}' > P_{max}$)

When the angular contact ball bearing 29 is provided for such the use, the inner ring 30 is formed of a material having a higher degree of the fracture toughness $K_{1c}$, thereby avoiding the cracks in the inner ring 30. In contrast, the outer ring 33 provided with the outer ring raceway 34 on which the maximum contact surface pressure Pmax is produced should be formed of a material which is highly resistant to the rolling contact fatigue represented by the mode 2, although such the material may have a lower degree of the fracture toughness $K_{1c}'$.

As will be clearly understood from the foregoing description, the present invention offers the following advantages. Since the ball bearing is constructed and operated as described above, the lives of both inner and outer ring raceways can be ensured without necessarily increasing the rotational resistance, thereby improving the durability of the ball bearing without impairing the performance of various types of devices having such ball bearings built therein.

should be understood that many modifications and adaptations of the invention will become apparent to those skilled in the art and it is intended to encompass such obvious modifications and changes in the scope of the claims appended hereto.

What is claimed is:

1. A ball bearing comprising:

a first raceway ring;

a first raceway having sectionally circular, but annular as a whole, said first raceway being formed on one surface of said first raceway ring;

a second raceway ring arranged to be concentric with said first raceway ring;

a second raceway having sectionally circular, but annular as a whole, said second race being formed on one surface of said second raceway ring and being positioned to opposedly face said first raceway; and a plurality of balls of which rolling surfaces are allowed to abut against said first and second raceways, said ball bearing being exposed to a stress field in which a stress intensity factor of said first raceway ring becomes greater than that of said second raceway ring during a use of said ball bearing, a fracture toughness of a material forming said first raceway ring being higher than that of a material forming said second raceway ring, and a maximum contact surface pressure between said first raceway and each of said balls being smaller than that between said second raceway and each of said balls.

2. A ball bearing as claimed in claim 1, wherein steel for bearing which is constructed said first and second raceway rings is performed by a carburizing treatment, a carbonitriding treatment or an induction hardening treatment.

3. A ball bearing as claimed in claim 1, wherein said first raceway ring is formed of power rollers having a function as an inner ring, said second raceway ring is formed of a thrust ball bearing as an outer ring, and there is provided a cage for retaining a plurality of balls in such a way that they can be allowed to freely roll.

4. A ball bearing as claimed in claim 3, wherein a thickness of said power rollers is greater than that of said outer ring.

5. A ball bearing as claimed in claim 4, wherein said power rollers are formed of surface hardened steel and said outer ring is formed of fully hardened steel.

6. A ball bearing as claimed in claim 4, wherein depth of carborizing treatment of said power rollers is formed shallower than that of said outer ring.

7. A ball bearing as claimed in claim 4, wherein a level of hardness of cores of said power rollers is formed smaller than that of said outer ring.

8. A ball bearing as claimed in claim 4, wherein a level of hardness of said power rollers is formed lower than that of said outer ring.

9. A radial ball bearing as claimed in claim 1, wherein said second raceway ring is fit around a shaft as an inner ring and said first raceway ring is fit inside a housing as an outer ring.

10. A radial ball bearing as claimed in claim 9, wherein said inner ring is formed of a material which is highly resistant to rolling fatigue while it has a lower degree of a fracture toughness.

11. An radial ball bearing as claimed in claim 1, wherein said second raceway ring is fit inside a housing as an outer ring and said first raceway ring is fit around a shaft as an inner ring.

12. An radial ball bearing as claimed in claim 11, wherein said inner ring is formed of a first material having a higher degree of a fracture toughness and said outer ring is formed of a second material which is highly resistant to rolling fatigue while it has a lower degree of a fracture toughness.

* * * * *